United States Patent [19]

Johnstone et al.

[11] 4,414,795

[45] Nov. 15, 1983

[54] SHAKING APPARATUS

[75] Inventors: Theodore R. Johnstone, 28342 Avenue 11, Madera, Calif. 93637; James P. Kaatz, 7 Hedge Ct., Apt. #1, Snyder, N.Y. 14226

[73] Assignees: Theodore R. Johnstone, Madera, Calif.; James P. Kaatz, Snyder, N.Y.; Edward T. Moon, Madera, Calif.; a part interest

[21] Appl. No.: 310,239

[22] Filed: Oct. 9, 1981

[51] Int. Cl.³ .................. A01D 46/26; A01D 46/00
[52] U.S. Cl. .......................... 56/328 TS; 56/329
[58] Field of Search .................. 56/328 TS, 329

[56] References Cited

U.S. PATENT DOCUMENTS

| 1,626,068 | 4/1927 | Bartlett | 56/328 TS |
|---|---|---|---|
| 2,913,866 | 11/1959 | Curtis | 56/329 |
| 3,120,091 | 2/1964 | Gould et al. | 56/328 TS |
| 3,163,458 | 12/1964 | Brandt, Jr. | 56/56 TS |
| 3,248,865 | 5/1966 | Gerrans | 56/328 TS |
| 3,338,040 | 8/1967 | Shipley, Jr. | 56/328 TS |
| 3,362,145 | 1/1968 | Steingas et al. | 56/328 TS |
| 3,457,712 | 7/1969 | Gould et al. | 56/328 TS |
| 3,460,329 | 8/1969 | Overstreet, Jr. | 56/328 TS |
| 3,477,215 | 11/1969 | Herbst | 56/328 TS |
| 3,505,801 | 4/1970 | Nye | 56/329 |
| 3,548,578 | 12/1970 | Shipley, Jr. | 56/328 TS |
| 3,621,643 | 11/1971 | Gerrans | 56/329 |
| 3,623,308 | 11/1972 | Nye | 56/329 |
| 3,683,617 | 8/1972 | Vallicella | 56/329 |
| 3,762,139 | 10/1973 | Tompkins | 56/328 TS |
| 3,780,510 | 12/1973 | Tompkins | 56/328 TS |
| 3,785,131 | 1/1974 | Friday et al. | 56/328 TS |
| 3,896,612 | 7/1975 | McHugh et al. | 56/329 |
| 3,964,244 | 6/1976 | Vallicella | 56/328 TS |
| 4,128,986 | 12/1978 | Santarelli | 56/328 TS |
| 4,170,100 | 10/1979 | Hood, Jr. et al. | 56/328 TS |
| 4,194,347 | 3/1980 | Peters | 56/328 TS |
| 4,254,608 | 3/1981 | Friday | 56/328 TS |
| 4,269,021 | 5/1981 | Friday | 56/329 |

Primary Examiner—Paul J. Hirsch
Attorney, Agent, or Firm—Huebner & Worrel

[57] ABSTRACT

An apparatus for shaking a work object, the apparatus having an arm adapted to be mounted on a vehicle for earth traversing movement in a predetermined direction of travel substantially parallel and in spaced relation to a work zone; a pair of jaws mounted on the arm and movable relative to each other between opened positions in which the jaws are separated from each other and spaced from the zone and closed positions in which the jaws are disposed in juxtaposition relative to each other and extended into the zone; a suspension system supporting the arm while permitting the arm to shift laterally and about its longitudinal axis when the jaws are moved into the closed positions in grasping relation to a work object; and a sealing assembly engagable with the work object above the jaws operable to maintain a seal therewith while accommodating movement of the work object during shaking.

13 Claims, 17 Drawing Figures

SHAKING APPARATUS

BACKGROUND OF THE INVENTION

1. Field Of The Invention

The present invention relates to a shaking apparatus and more particularly to such a shaking apparatus which is particularly well suited to harvesting crops from trees grown in a row without having successively to move the conveying vehicle or the shaker head toward each tree for engagement of the shaking head therewith, which is operable to self adjust to the particular configuration of each tree as it engages the tree, and which establishes sealing engagement with the tree in such a manner as to insure that substantially all of the crop is recovered while avoiding any interference with the shaking operation.

3. Description Of The Prior Art

It has long been known to employ a shaking force or vibrating energy to harvest crops and a wide assortment of devices have been developed to achieve this objective. Typically such devices capture the trunk of a tree from which crops are to be harvested between a pair of jaws and apply an impact or shaking force to the trunk which is transmitted through the tree to dislodge the crops from the tree. However, a multitude of problems have developed with such prior art effects. For example, the vehicles on which the jaws are mounted must usually be maneuvered toward each tree in succession and positioned precisely so that the jaws are operable to grip the tree. While skilled personnel can achieve a certain degree of dexterity using such vehicles so as to reduce the time necessary for proper positioning, the problem of precise maneuvering of the vehicle and positioning of the shaking head has been and remains one of chronic proportions. Various devices have been developed wherein the vehicle remains stationary and the shaking head is advanced into the tree. At least one apparatus, as evidenced by the Peters U.S. Pat. No. 4,194,347, has a pair of jaws which need not be advanced toward the tree, but rather are independently pivotal through arcs of ninety degrees (90°). Nonetheless, it is believed that all such prior efforts have not been entirely satisfactory in overcoming problems of maneuvering and precise positioning.

Other problems which have plagued prior art harvesters include those caused by variations from tree to tree in trunk diameter, angle with respect to true vertical and the overall relative size of the tree. Variations of this type require even more attention to precise positioning adjustment of the shaking head before the shaking force is applied. This compounds the amount of time necessary for harvesting crops from a given tree and typically results in damage to the trees involved through the inattention of operators to such matters.

A still further problem inherent in such prior art devices is the inability to maintain a seal about the tree trunk above the shaking head during the shaking operation so that all of the crops dislodged from the tree are collected.

Therefore, it has long been known that it would be desirable to have a shaking apparatus which reduces to an absolute minimum time required for maneuvering and positioning of the shaking head, which insures alignment and adjustment to the individual characteristics of each successive tree, and which establishes a seal about the tree trunk capable of maintaining the seal while shaking of the tree is in progress.

SUMMARY OF THE INVENTION

Therefore, it is an object of the present invention to provide an improved shaking apparatus which overcomes the difficulties inherent in the prior art shaking devices.

Another object is to provide such a shaking apparatus which greatly reduces the amount of time required for harvesting crops from a given number of trees by minimizing the amount of time required for engagement and disengagement of the shaking head from the tree.

Another object is to provide such a shaking apparatus which is capable of movement longitudinally along a row of trees to be harvested and can be positioned in engagement with each successive tree in the row for harvesting without maneuvering of the vehicle of movement of the shaking head in the direction of the tree.

Another object is to provide such a shaking apparatus which is self adjusting to the degree that it can substantially automatically accommodate variations in three configurations including variation in the diameters of the trunks, variation in the angles of disposition of the trunks with resect to true vertical, variation in the heights of the trees and the like without causing damage to the trees.

Another object is to provide such a shaking apparatus in which the various forces which are inherent in the application of a shaking force and when tend in prior art devices to be destructive to the devices themselves, are applied in such a manner as to minimize these destructive effects.

Another object is to provide such shaking apparatus which can be constructed as a complete and fully operational apparatus, or which can be constructed in a form permitting it to be installed on conventional vehicles already in use.

Another object is to provide such a shaking apparatus which mounts the shaking head in such a way that it can be positioned quite low to the earth surface for harvesting crops from small trees, or elevated well above the earth surface for harvesting crops from much larger trees.

Another object is to provide such a shaking apparatus which has a crop catching frame which is fully adjustable and positionable so as to insure collection of virtually all of the crops dislodged from the trees during harvesting.

Another object is to provide such a shaking apparatus which employs a mechanism for establishing a seal about a tree during harvesting above the shaking head so as to direct all of the crops onto the catching frame and which does so in such a manner as to maintain the seal while the trunk of the tree is in motion as a result of the shaking operation.

Another object is to provide such a shaking apparatus which employs an hydraulic system operable to perform all of the various functions involved using a minimum of controls while maintaining full control and adjustability in all of the operations involved.

Further objects and advantages are to provide improved elements and arrangements thereof in an apparatus for the purposes described which is dependable, economical, durable and fully effective in accomplishing its intended purposes.

DESCRIPTION OF THE PREFERRED EMBODIMENT

Figure 1:
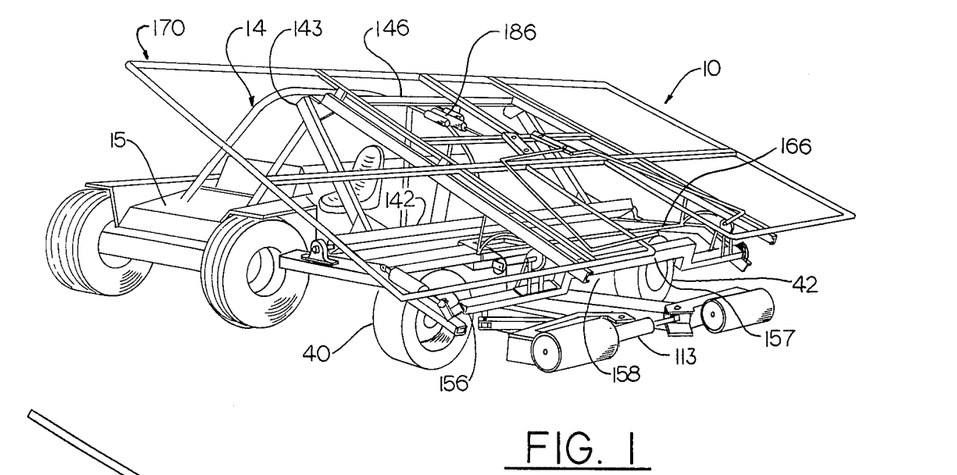
FIG. 1 is a perspective view of the shaking apparatus of the present invention shown mounted on a conventional vehicle for earth transversing movement.
Figure 2:
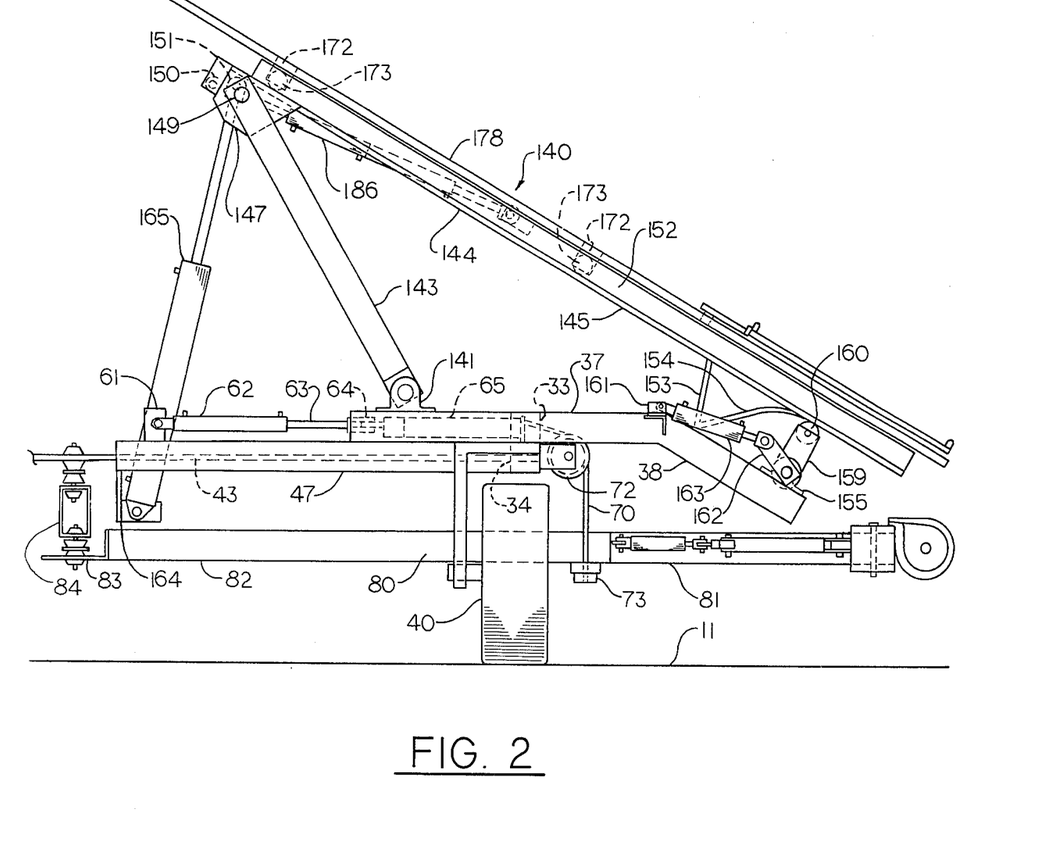
FIG. 2 is a somewhat enlarged, fragmentary, front elevation of the shaking apparatus of FIG. 1.

Referring more particularly to the drawings, the shaking apparatus of the present invention is generally indicated by the numeral 10 in FIG. 1. The shaking apparatus is shown in FIG. 2 supported on the earth support 11. The apparatus is adapted to be transported along a work zone 12, in this case a row of trees. The trunks of successive trees in the row are indicated at 13.

Figure 7:
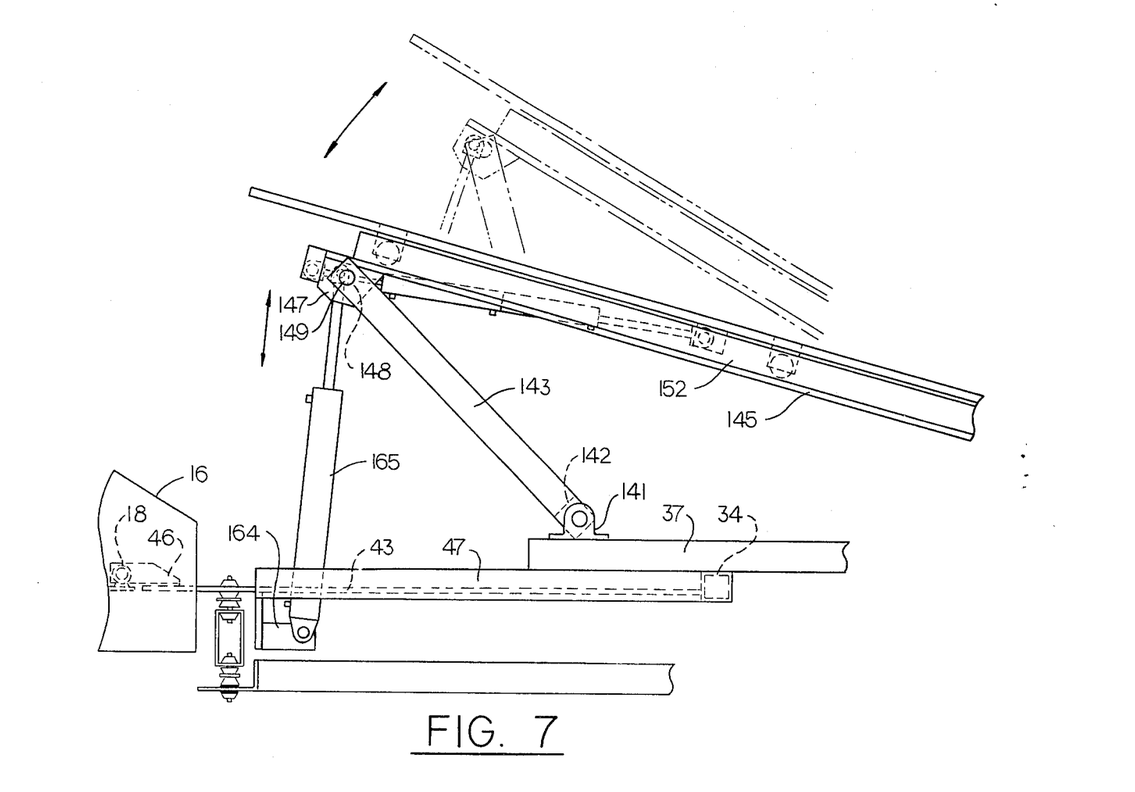
FIG. 7 is a fragmentary end view of the catching frame assembly of the shaking apparatus showing the assembly in full lines in one attitude and in phantom lines in a second attitude.

The shaking apparatus 10 can be constructed as an entirely self contained and self propelled vehicle. Alternatively, and as illustrated herein, the apparatus can be mounted on a conventional, self propelled vehicle such as indicated at 14 in FIG. 1. A suitable vehicle, such as for example the carrier vehicle of the harvester of the Orhard Machinery Corporation, has a front portion 15, opposite side portions 16 and a rear portion 17. A ball type trailer hitch 18 is mounted in upstanding relation on a side portion 16 of the vehicle as, perhaps, best shown in FIG. 7. The vehicle 14 is adapted for earth traversing movement in a normal direction of travel as indicated by arrow 19 in FIG. 3. Similarly, it will be understood that the vehicle is maneuverable and possesses an hydraulic system to which the hydraulic system of the apparatus of the present invention can be attained.

Figure 3:
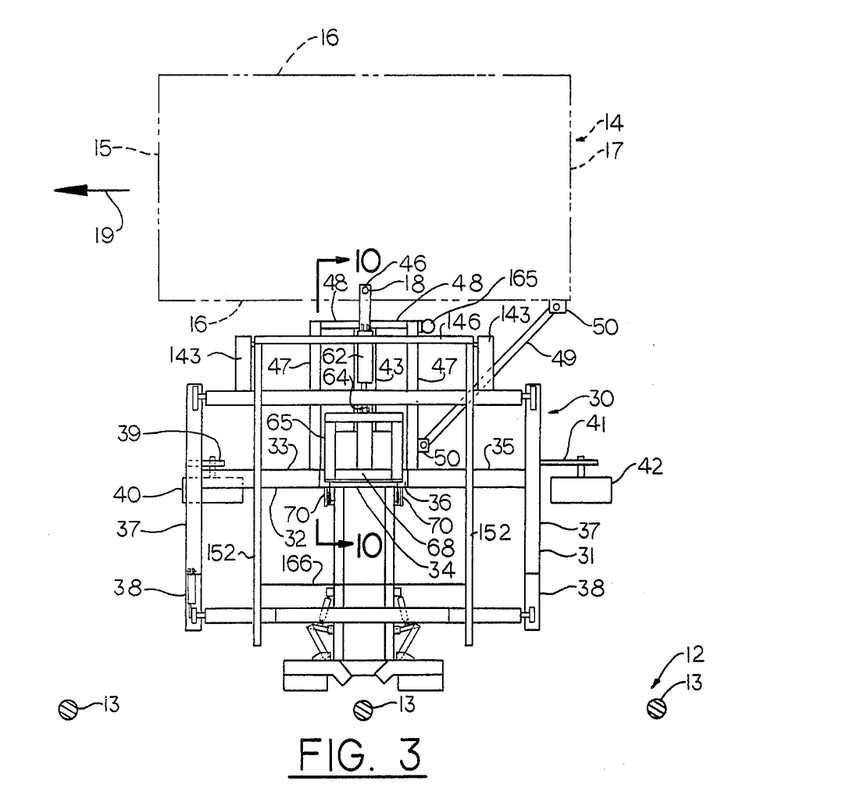
FIG. 3 is a fragmentary top plan view of the shaking apparatus of FIG. 1 with the catching frame thereof removed for illustrative convenience and with the conventional vehicle shown in phantom lines.
Figure 10:
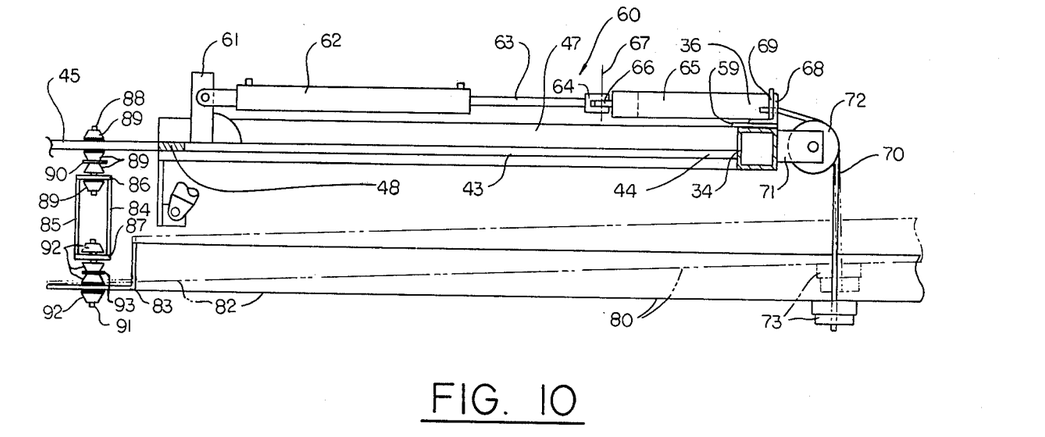
FIG. 10 is a fragmentary transverse vertical section of the shaking apparatus taken from a position indicated by line 10—10 in FIG. 3 and showing the arm suspension system of the shaking apparatus.

The shrinking apparatus 10 has a carrier 30, best shown in FIGS. 2, 3, and 10, with a main frame 31. The main frame has a central longitudinal beam 32 composed of a forward section 33, a central section 34 and a rearward section 35. The sections are welded together in alignment longitudinally of the carrier to form the central longitudinal beam, as best shown in FIG. 3. The central section is welded on the undersides of and interconnecting the forward and rearward sections so as to form a channel or passage 36 above the central section and between the forward and rearward sections. A pair of transverse beams 37 are individually mounted in substantially right angular relation on the forward section 33 and the rearward section 35 of the central longitudinal beam 32. The transverse beams have angled portions 38 extending downwardly from corresponding ends of the beams at oblique angles toward the right as viewed in FIG. 2. A front wheel mount 39 is secured on the forward section 33 and adjacent transverse beam 37 of the main frame 31. A front wheel 40 is rotationally received on the front wheel mount. Preferably, although not necessarily, the front wheel mount is fixed to travel a path parallel to the normal direction of travel 19 of the vehicle 14. A rear wheel mount 41 is mounted on the rearward section 35 and adjacent transverse beam 37 of the main frame 31 and mounts a rear wheel 42 for rotational movement thereon. Preferably, although not necessarily, the rear wheel mount 41 is of the swivel type permitting the wheel to provide about a vertical axis to accommodate maneuvering of the shaking apparatus.

A tongue member 43, having a frame end portion 44 and an opposite hitch end portion 45, is mounted by welding of its frame end portion 44 on the central section 34 of the central longitudinal beam 32 extending in substantially right angular relation thereto transversely of the shaking apparatus 10, as shown in FIG. 10. A hitch 46, adapted for connection to a ball type trailer hitch such as nitch 18 of vehicle 14, is mounted on the hitch end portion 45 of the tongue member and disposed for mounting the ball type trailer hitch 18 of the vehicle. A pair of brace members 47 are secured by welding on the opposite ends of the central section 34 of the central longitudinal beam 32 and extend in right angular relation therefrom substantially parallel to the tongue member 43. The brace beams 47 are individually connected to the tongue member adjacent to the hitch end portion thereof by a pair of connecting plates 48 welded on the respective brace beams and tongue member so as to extend therebetween, as best shown in FIG. 3.

A linking arm 49 interconnects the rearwardmost brace beam 47 and the lateral corner of the rear portion 17 of the vehicle 14 by a pair of pivotal connections 50. The pivotal connections can be disconnected permitting the shaking apparatus to be removed from the vehicle 14 by disconnection of the pivotal connections 50 of the linking arm 49 and of the hitch 46 from the hitch 18 of the vehicle.

A pair of bearing or wear plates 59 are mounted on the upper surface of the central section 34 of the central longitudinal beam 32 facing upwardly and defining a substantially common plane.

An arm suspension assembly or system for the apparatus 10 is indicated by the numeral 60 and is best shown in FIG. 10. The arm suspension system includes a cylinder mount 61 affixed in upstanding relation on the hitch end portion 45 of the tongue member 43. An hydraulic cylinder 62 is mounted on the cylinder mount and has a cylinder rod 63 extending from the cylinder on the opposite side thereof from the cylinder mount. The cylinder rod has a clevis 64 fastened thereon. A frame 65 has a flange 66 which is connected to the clevis 64 for pivotal movement substantially about a vertical axis 67. An angle iron member 68 is secured, as by welding, on the frame 65 in rested engagement with the wear plates 59 in the channel 36 between the forward and rearward sections 33 and 35 respectively of the central longitudinal beam 32. A pair of linear members or cable mounts 69 are mounted in spaced relation on the angle iron member and individually mount a pair of cables 70 extending through the angle iron member. The frame 65, angle iron member 68 and pair of cable mounts 69 constitute a cable mounting assembly. A pair of pulley mounts 71 are mounted on the central section 34 of the central longitudinal beam 32 and individually mount bearing members or pulleys 72 therein for rotational movement about horizontal axes substantially parallel to the central longitudinal beam 32. The cables 70 are individually entrained about the pulleys 72 and mount at their terminal ends a supporting bar 73 extending therebetween.

The shaking apparatus 10 has a shaking arm 80 having a shaking end portion 81 and an opposite suspension end portion 82. A mounting plate 83 is borne by the suspension end portion 82 of the arm. As shown best in FIGS. 2, 3, and 10, the arm is supported on the carrier 30 by mounting of the arm on the supporting bar 73 of the arm suspension system 60. The arm is also mounted in pendant relation on the carrier by a suspension assembly 84 interconnecting the plate 83 of the arm and the hitch end portion 45 of the tongue member 43. The suspension assembly 83 includes a box or housing 85 having an upper plate 86 and a lower plate 87. An upper swivel pin 88 is extended through the upper plate 86 of the box and the tongue member 43 so that the box is supported on the swivel pin beneath the tongue member. Four resilient members 89 are individually positioned on the upper swivel pin in engagement with and on opposite sides of the tongue member and of the upper plate 86 of the box, as shown in FIG. 10. A plate 90 is received on the upper swivel pin between the adjacent bushings between the upper plate and the tongue member. A lower swivel pin 91 is extended through the lower plate 87 of the box and the plate 83 of the arm so as to suspend the plate 83 from the box. Four resilient members 92 are received about the lower swivel pin on opposite sides of the lower plate 87 of the box and of the plate 83, also as shown in FIG. 10. The resilient members between the plate 83 and the lower plate 87 of the box are separated from each other by a plate 93 on the lower swivel pin. Accordingly, it will be seen that the plate 83 and thus the suspension end portion 82 of the arm 80 is supported in depending relation on the tongue member of the carrier and is able to swivel about a vertical axis in relation to the tongue member and to swing laterally with substantially full freedom of movement as permitted by the suspension assembly 84. Similarly, the arm suspension system 60 permits the arm to shift from side to side of the cables 70 and to pivot about its longitudinal axis. Such pivoting about the longitudinal axis is permitted by the suspension system 60 in that if more pressure is applied to one of the cables 70 by force tending to cause pivoting, that cable causes that end of the angle iron member 68 to slide forwardly on the wear plates 59 so as to cause the frame 65 to pivot about the vertical axis 67. This effectively permits that cable 70 to be pulled downwardly about the pulley 72 thereby permitting the arm to be pivoted a short distance about its longitudinal axis. This action in no way interferes with the mounting of the arm since such movement is permitted by the arm suspension system 60 and the suspension assembly 84. Similarly, there is not adverse effect on the carrier 30 or arm suspension system 60 since such movement is permitted by the interoperation of the cables, angle iron member, wear plates 59 and clevis 64 permitting movement about the vertical axis 67 thereof.

Figure 15:
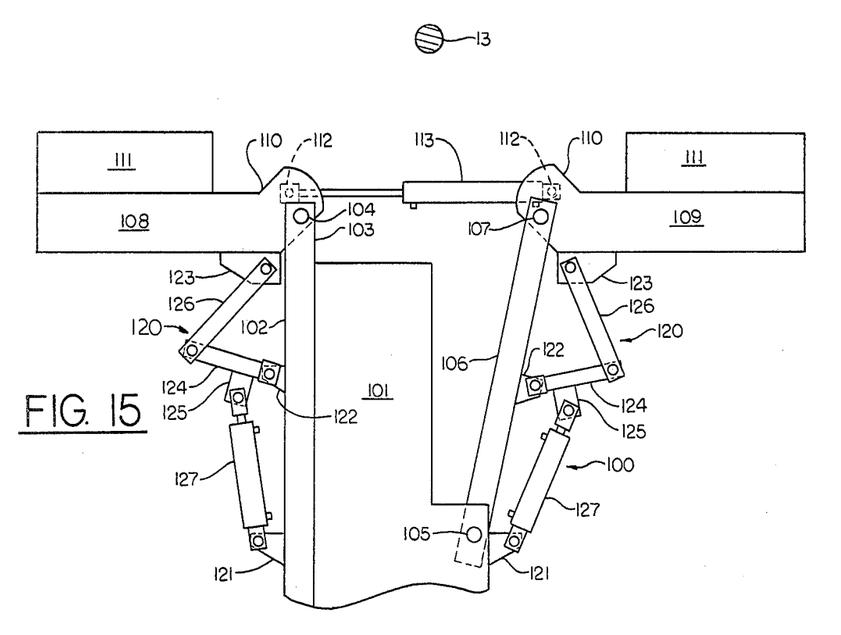
FIG. 15 is a fragmentary plan view of the shaking head of the shaking apparatus showing the jaws thereof disposed in operation positions.
Figure 16:
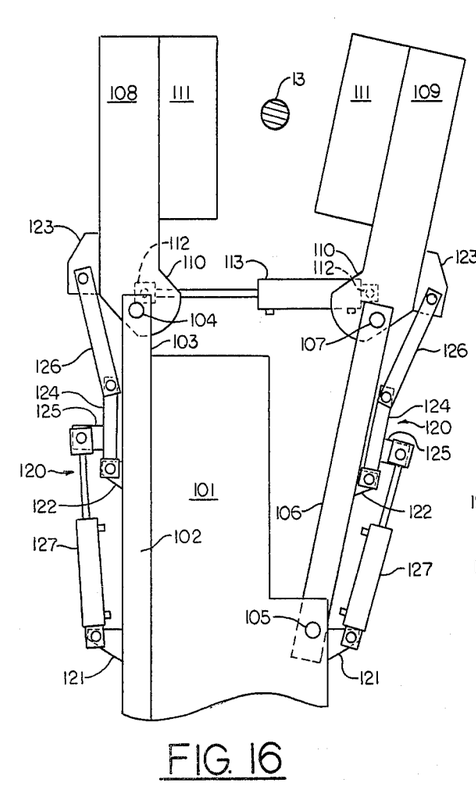
FIG. 16 is a fragmentary plan view of the shaking head of the shaking apparatus showing the jaws thereof in intermediate positions.
Figure 17:
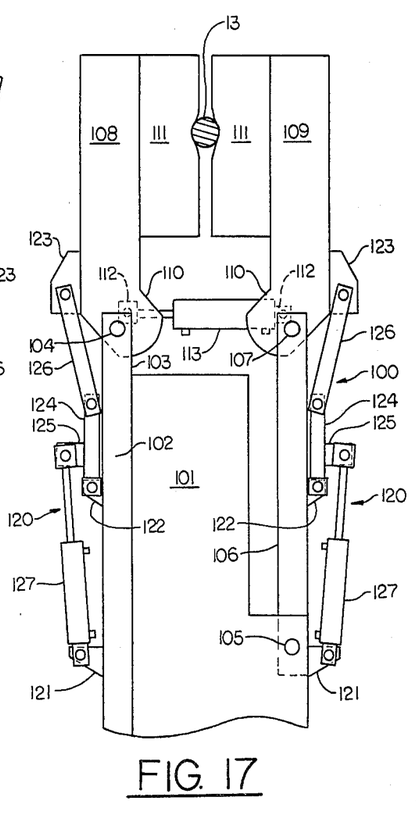
FIG. 17 is a fragmentary plan view of the shaking head of the shaking apparatus showing the jaws thereof in closed positions.

The shaking apparatus 10 has a shaking head 100, best shown in FIGS. 15, 16, and 17. The shaking head has a housing 101 which is mounted on and extended from the shaking end portion 81 of the arm 80. The housing contains any suitable mechanism, not shown, for imparting a shaking action to the shaking head. This is conventionally done through the use of a hydraulic motor driving weighted wheels, although any one of a wide variety of mechanisms can be employed.

The shaking head 100 has a fixed arm 102 which is secured on the housing 101 and extends to an extended end 103 beyond the end of the housing. A first pivotal connection or pivot mount 104 is borne by the extended end of the fixed arm 102. An arm pivotal connection or pivot mount 105 is provided on the housing on the opposite side thereof from the fixed arm 102, as shown in FIGS. 15, 16 and 17. A pivot arm 106 is pivotally mounted on the pivot mount 105 for pivotal movement about the axis thereof which is substantially normal to the shaking arm 80. The pivot arm has a second pivotal connection or pivot mount 107 adjacent to the remote end thereof, as shown in FIGS. 15, 16, and 17. The pivot mounts 104, 105 and 107 individually define axes of rotation normal to the arm.

A first jaw 108 is mounted on the first pivot mount 104 for pivotal movement about the axis thereof between the position shown in FIG. 15 and the position shown in FIGS. 16 and 17. This range of movement about the axis is approximately ninety degrees (90°). A second jaw 109 is mounted for pivotal movement on the second pivot mount 107 for movement about the axis thereof between the position shown in FIG. 15 and the position shown in FIGS. 16 and 17. This range of movement is approximately ninety degrees (90°). The jaws have recessed, or channel portions 110 adjacent to their respective pivotal connections 104 and 107. The jaws individually mount cushions 111 thereon in corresponding positions so as to be positionable in juxtaposition, as shown in FIG. 17. Cylinder mounts 112 are mounted on the jaws within the channel portions 110 thereof in corresponding positions eccentric to the respective first and second pivot mounts 104 and 107, as shown in FIGS. 15, 16, and 17. An hydraulic cylinder 113 operably interconnects the cylinder mounts 112.

A pivot assembly 120 is mounted on the fixed arm 102 and the pivot arm 106. Each pivot assembly has an hydraulic cylinder mount 121 affixed on its respective arm remote from its respective pivotal connection 104 or 107. Each pivot assembly has a first linkage mount 122 fastened on its respective arm substantially midway between the cylinder mount 121 and its respective pivotal connection 104 or 107. Each pivot assembly has a second linkage mount 123 secured on the first or second jaw 108 and 109 respectively of its respective arm 102 or 106. A first link 124 is mounted on the first linkage mount 122 of each pivot assembly. Each first link has a flange 125 in spaced relation to the linkage mount 122. A second link 126 is secured for pivotal movement on the remote end of each first link 124 and is pivotally connected at its opposite end to the second linkage mount 123 of that respective pivot assembly. The first and second links of each pivot assembly constitute a linkage. An hydraulic cylinder 127 interconnects the cylinder mount 121 and the flange of the first link of each pivot assembly.

As shown in FIG. 15, the jaws 108 and 109 are disposed in opened attitudes or positions substantially aligned with each other in right angular relation to the shaking arm 80 and substantially parallel to the work zone 12 when the shaking apparatus is operated as herein described. The pivot assemblies 120 are operable under the power of the hydraulic cylinders 127 to pivot the first and second jaws 108 and 109 repectively from the opened positions shown in FIG. 15 to the positions shown in FIG. 16 or, in other words, through a range of positions of ninety degrees (90°). As shown in FIG. 16, it will be understood that the first and second jaws are disposed in intermediate attitudes or positions. The hydraulic cylinder 113 is operable to cause the pivot arm 106 to pivot about pivot mount 105 to draw the first and second jaws into the closed attitudes or positions shown in FIG. 17.

The apparatus 10 has a catching frame assembly 140 mounted on the carrier 30 and best shown in FIGS. 1 and 2. A pair of bearings 141 are individually mounted on the transverse beams 37 of the main frame 31 aligned to define a common axis of rotation parallel to the normal direction of travel 19 of the vehicle 14. A shaft 142 is rotationally mounted in the bearings 141 and mounts a pair of lever arms 143 in spaced relation thereon normal to the shaft.

Figures 5, 6:
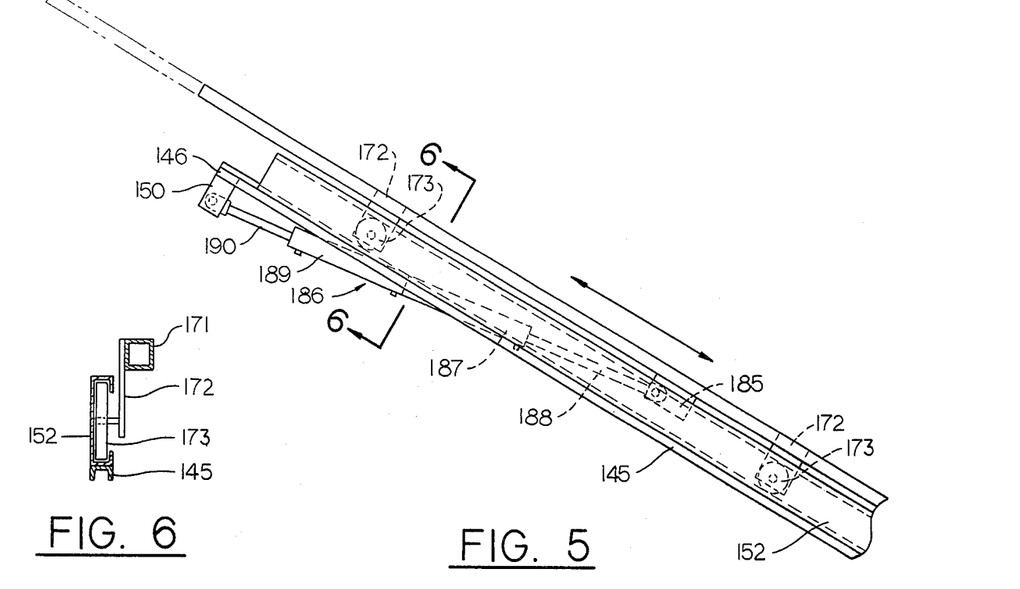
FIG. 5 is a somewhat enlarged, fragmentary end view of the catching frame assembly of the shaking apparatus.
FIG. 6 is a somewhat further enlarged, fragmentary section taken on line 6—6 in FIG. 5.

A subframe 144 is mounted on the lever arms 143. The subframe has a pair of channel members 145 which are inverted, as shown in FIG. 6 and which are interconnected at upper ends by a cross member 146 so that the channel members are disposed in parallel relation extending transversely of the apparatus and substantially parallel to the shanking arm 80. The pair of bearing plates 147 are individually secured, as by welding, on the channel members 145 adjacent to the cross member 146 extending downwardly therefrom. A pair of bearings 148 are individually mounted on the bearing plates so as to define a common axis of rotation parallel to the axis defined by the bearings 141. A pivot shaft 149 is borne by the upper end of each lever arm and received in the respective adjacent bearings 148 to mount the subframe pivotally with respect to the lever arms. A pair of first cylinder mounts 150 are mounted on the cross member 146 substantially centrally thereof. A second cylinder mount 151 is mounted on the cross member in proximity to the pair of first cylinder mounts. A pair of tracks 152 are individually mounted on the upper surfaces of the channel members 145 extending therealong and oriented so that their respective tracks face each other.

A cam track 153 is mounted on the underside of each channel member 145 adjacent the lower end thereof, as best shown in FIG. 2. Each cam track has a concave arcuate portion 154 facing and above the angled portion 38 of its respective transverse beam 37. A pair of bearings 155 are individually mounted on the angle portions 38 adjacent the lower terminal ends thereof and aligned so as to define a common axis of rotation parallel to those defined by the bearings 141 and 148. A shaft 156 is rotationally mounted in the bearings 155 extending therebetween. The shaft has a raised portion 157 over the shaking arm 80 defining a recess 158 within which the shaking arm can be raised.

A pair of roller mounts 159 are individually affixed in upstanding relation on the shaft 156 directly under each of the channel members 145. Each roller mount has a cam roller 160 mounted thereon for rotational movement within the channel member 145 and cam track 153 of its respective channel member 145.

Figures 8, 9:
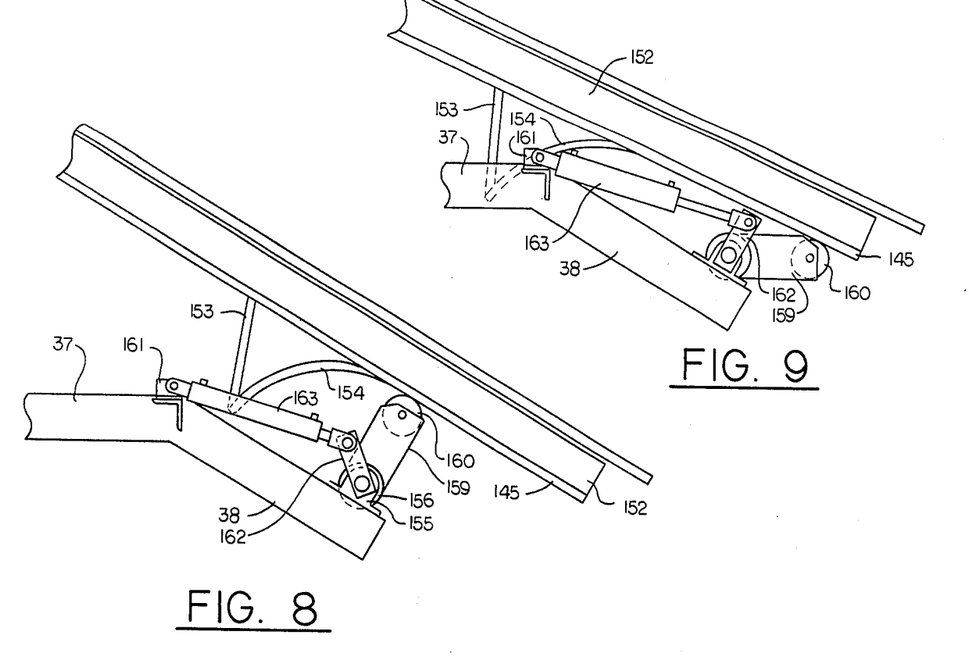
FIG. 8 is a fragmentary end view of the shaking apparatus showing the cam track with the cam rollers in elevated attitudes.
FIG. 9 is a fragmentary end view of the shaking apparatus as viewed in FIG. 8, but showing the cam rollers in lowered attitudes.

A cylinder mount 161 is affixed on the transverse beam 37 on the left as viewed in FIG. 1. A lever arm 162 is mounted in upstanding relation on the end of the shaft 156 above the transverse beam 37 having the cylinder mount 161. An hydraulic cylinder 163 operably interconnects the cylinder mount 161 and the lever arm 162 and is operable for moving the cam rollers 160 borne by the shaft between the position shown in FIG. 9 and the position shown in FIG. 8. A cylinder mount 164 is secured on and extends below the tongue member 43 of the carrier 30. The cylinder mount is mounted in alignment with the second cylinder mount 151 of the subframe 141. An hydraulic cylinder 165 is mounted on and interconnects the cylinder mount 164 and the cylinder mount 151, as shown best in FIG. 2. A brace 166 is mounted on and extends between the cam tracks 153 to maintain the cam tracks parallel to each other. It will be seen that by expanding the hydraulic cylinder 165, the subframe 144 is pivoted upwardly on the lever arms 143 about the axis of rotation of the bearings 141. Upward movement first elevates the lateral edge of the subframe on the left as viewed in FIG. 2 and then, as the lever arms approach a vertical attitude, the subframe moves in a direction to the right as viewed in FIG. 2. Thus, when the cam rollers 160 are in the attitude shown in FIG. 8, the subframe 144 moves to the right and draws the arcuate portion 154 of the cam track 153 of each track 152 into and over its respective cam roller. This causes the portion of the subframe thereabove to be elevated during continual movement. The operative effect of the cam rollers and cam tracks is to cause the subframe to move through positions of parallelism to the attitude shown in FIG. 2 toward the right as viewed therein once the angle of the subframe has reached the angle shown in FIG. 2.

Figure 14:
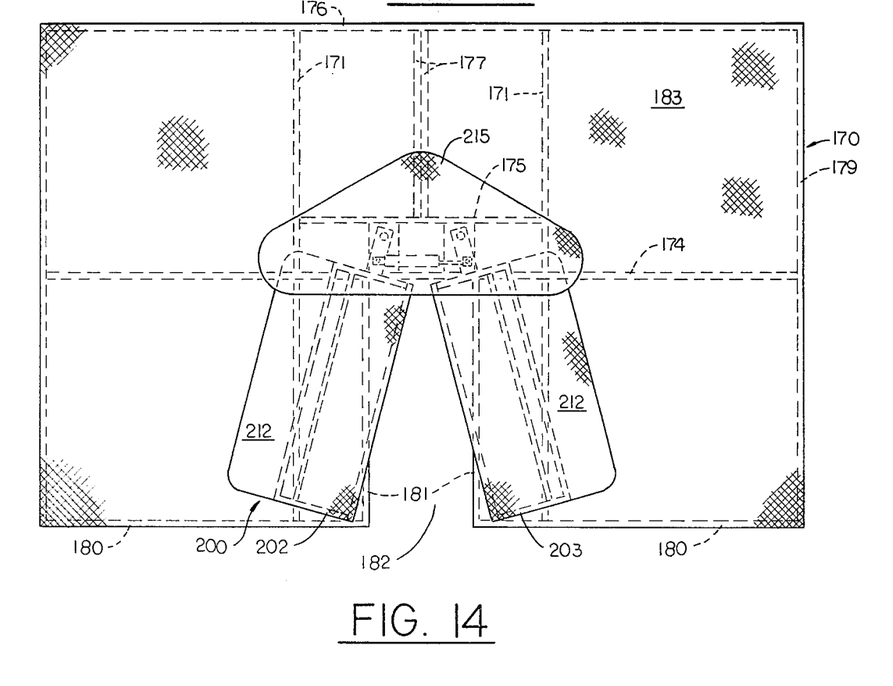
FIG. 14 is a plan view of the catching frame of the shaking apparatus showing the tree sealing mechanism mounted thereon and disposed in the opened attitude.

A catching frame 170 is borne by the subframe 144. The catching frame has a pair of tubular beams 171 each having a pair of roller mounts 172 extending downwardly therefrom. A roller 173 is mounted on each roller mount and the rollers of each tubular beam are received in a respective one of the tracks 152 for movement therealong, as best shown in FIG. 6. A longitudinal beam 174 is mounted on the tubular beams 171 extending in right angular relation thereto substantially in parallel to the normal direction of travel 19 of the vehicle 14. The tubular beams 171 are each preferably composed of a pair of sections welded on opposite sides of the longitudinal beam 174 so that the tubular beams 171 and longitudinal beam 174 define a substantially common plane. A parallel beam 175 is mounted on and interconnects the pair of tubular beams 171 in spaced, substantially parallel relation to the longitudinal beam 174. A distal portion or upper lateral member 176 is mounted on the tubular beams 171 in spaced substantially parallel relation to the longitudinal beam 174. A pair of braces 177 are mounted on and interconnect the upper lateral member at a position midway between the tubular beams 171 and the parallel beam 175, as best shown in FIG. 14. The catching frame has a forward member 178 mounted on an interconnecting the upper lateral member 176 and the longitudinal beam 174 and extending therebeyond, as shown in FIG. 14. A rearward member 179 is similarly secured on the opposite end of the upper lateral member 176 and longitudinal beam 174 parallel to the forward member and extending beyond the longitudinal beam the same distance as the forward member. A pair of proximal portions or lower lateral members 180 are mounted on the free ends of the forward and rearward members 178 and 179 extending parallel to the upper lateral member 176 to positions in spaced relation to each other. A pair of parallel members 181 are affixed on the free ends of the lower lateral members and extend in right angular relation thereto and are mounted on the longitudinal beam 174 so as to define a slot or opening 182 for the catching frame therebetween. The catching frame is covered by a fabric panel 183 covering the entire catching frame with the exception of the opening 182 and the area bounded by the longitudinal beam 174, parallel beam 175 and tubular beams 171.

A pair of mounting plates 184 are welded on and interconnect the beams 174 and 175 in spaced relation to each other. A cylinder mount 185 is mounted on the beam 175 substantially centrally thereof. An hydraulic cylinder assembly 186 operably interconnects the pair of first cylinder mounts 150 and the cylinder mount 185. The hydraulic cylinder assembly has a central hydraulic cylinder 187 having a cylinder rod 188 connected to the cylinder mount 185. Secured on opposite sides of the central hydraulic cylinder are a pair of lateral hydraulic cylinders 189 facing in the opposite direction and having their cylinder rods 190 individually mounted on the pair of first cylinder mounts 150. Preferably, although not necessarily, the range of expansion and contraction of the central hydraulic cylinder is about three feet while the range of expansion and contraction of the pair of lateral hydraulic cylinders is about one foot. Thus, it will be seen that by expanding all three hydraulic cylinders, just the pair of lateral hydraulic cylinders, or just the central hydraulic cylinder, the catching frame 170 can be motivated to the right from the position viewed in FIG. 2 through a range of positions as permitted by the rollers 173 received in the tracks 152 of the subframe 144. Thus, the operator has a range of expansion and contraction of up to four feet from the retracted position shown in FIG. 2.

Figure 11:
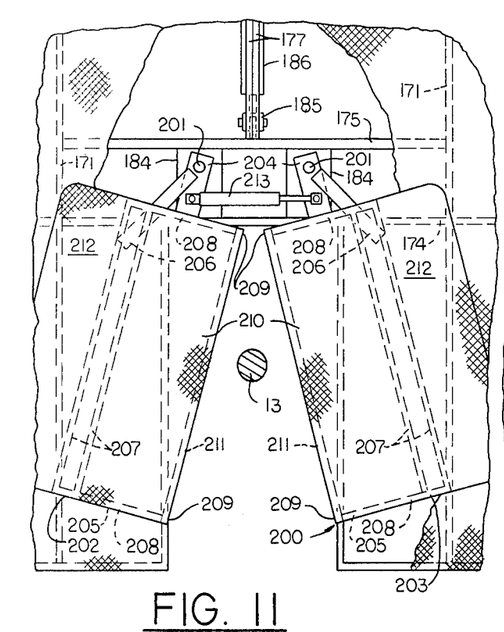
FIG. 11 is a fragmentary plan view of the tree sealing assembly of the shaking apparatus shown in an opened attitude.
Figure 12:
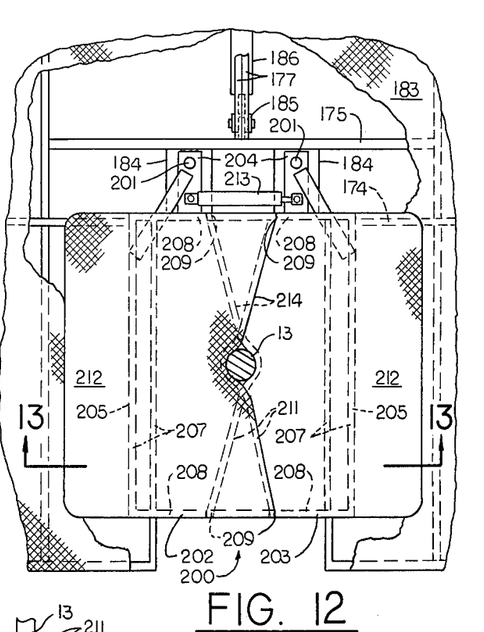
FIG. 12 is a fragmentary plan view of the tree sealing assembly of FIG. 11 shown in a closed attitude.
Figure 13:
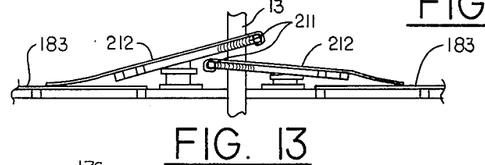
FIG. 13 is a section taken on line 13—13 in FIG. 12.

A work object or trunk engaging or tree sealing assembly 200 is mounted on the catching assembly 140 and is best shown in FIGS. 11 through 14. The tree sealing assembly has a pair of bearings 201 individually mounted on the mounting plates 184 of the catching frame 170. A first closure 202 and a second closure 203 are individually mounted on the bearings 201 for pivotal movement about axes substantially normal to the plane defined by the catching frame 170. Each closure has a mounting plate 204 which is mounted for pivotal movement on the bearing 201 and has a frame 205 extended therefrom downwardly and to the right as shown in FIG. 2. A brace plate 206 is weldably secured on the mounting plate 204 and the frame 205 is reinforcing relation. The frame of each closure has a pair of parallel back members 207 interconnecting a pair of parallel members 208 which extend to terminal ends 209 facing generally the terminal ends of the frame of the other closure. The side members define a mouth for each closure so that the mouths of the closures generally face each other. However, as can best be seen in FIG. 13, the bearings mount the closures so that they converge in a direction away from the catching frame toward the terminal ends. The terminal ends 209 of each closure are interconnected by a coil spring 211 mounted thereof and extending therebetween. The coil springs are only under slight tension. A resilient panel 212 is folded over the coil spring and along the upper surface of the frame 205 of each closure, as best shown in FIG. 13, and fastened into position. Each resilient panel has a free end remote from the mouth of its respective frame and rested on the fabric panel 183 of the catching frame 170.

An hydraulic cylinder 213 is mounted on and interconnects the mounting plates 204 of the closures 202 and 203 and is operable to move the closures between the opened positions shown in FIG. 11 in which the closures substantially expose the opening 182 of the catching frame 170 and the closed positions shown in FIGS. 12 and 13 in which overlapping edges 214 of the closures overlap each other a distance of preferably about five inches. As can be seen in FIGS. 12 and 13, when the closures are in the closed positions in engagement with a tree trunk 13, the overlapping edges conform to the trunk of the tree so as to leave virtually no space between the tree trunk and the closures about the entire diameter of the trunk. Similarly, as can be visualized in FIG. 12, the closures are free to pivot when in the closed positions from side to side about their respective bearings 201 while retained in the closed positions by the hydraulic cylinder 213. As shown in FIG. 14, a shroud 215 is mounted on the fabric panel 183 of the catching frame 170 over the area bounded by the longitudinal beam 174, parallel beam 175 and tubular beams 171. The closures 202 and 203 are free to move between the positions heretofore described under the shroud, as shown in FIG. 14.

Figure 4:
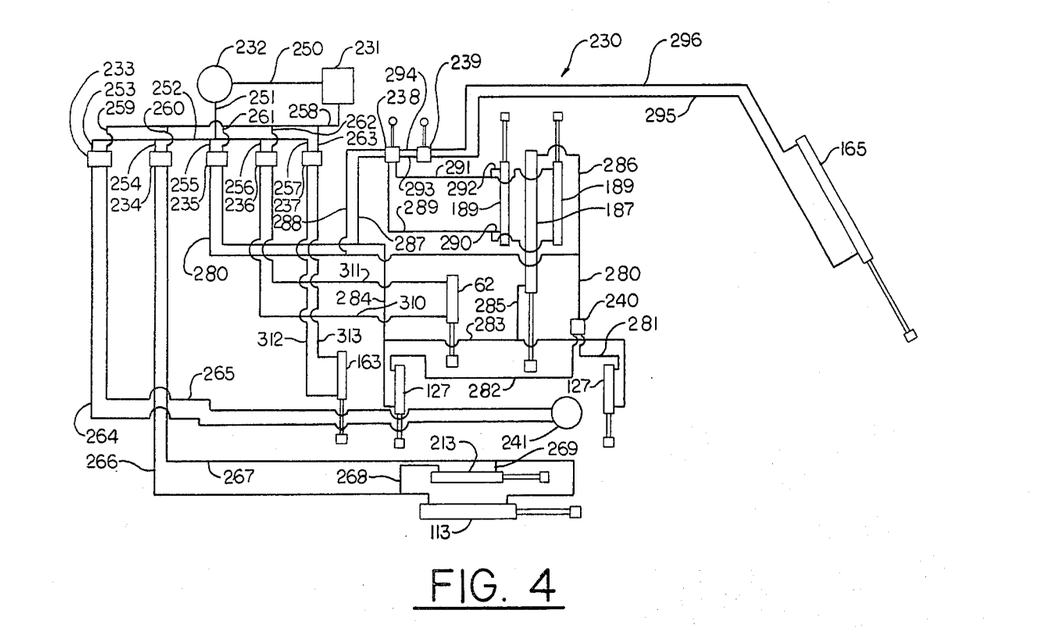
FIG. 4 is a schematic diagram of the hydraulic system of the shaking apparatus of the present invention.

Referring more particularly to FIG. 4, the hydraulic system for the shaking apparatus 10 is generally indicated by the number 230 therein. As previously discussed, the shaking apparatus 10 can be constructed as a complete operative unit having its own vehicle and self contained hydraulic system or, alternatively, can be constructed as shown and described herein as an apparatus adapted for attachment to a conventional vehicle having its own hydraulic system. The hydraulic system as shown in FIG. 4 is intended to represent a suggested hydraulic system for the shaking apparatus but also showing portions of the hydraulic system of the conventional conveying vehicle 14 on which the shaking apparatus 10 of the form of the invention herein described is mounted.

Thus, the hydraulic system 230 has a tank or reservoir 231, a pump 232 and five control valves 233, 234, 235, 236, and 237 respectively. Similarly, the hydraulic system has a first diverter 238 and a second diverter 239. For purposes of understanding the operation of the apparatus, it will be understood that these portions of the hydraulic system are mounted on the vehicle 14 at suitable locations accessible to the operator. The hydraulic system also has a flow divider 240 and a shaker motor 241. The shaker motor is mounted on or within the housing 101 of the shaking head 100 for operating the shaking mechanism, not shown, within the housing.

The hydraulic system 230 has an hydraulic conduit 250 interconnecting the tank 231 and the pump 232. An hydraulic conduit 251 interconnects the pump and an hydraulic conduit 252. Hydraulic conduit 252 is connected in fluid supplying relation to the control valves 233 through 237 respectively through individual hydraulic conduits 253, 254, 255, 256, and 257 respectively. Hydraulic conduit 258 extends from the tank 231. Hydraulic conduit 258 is connected to the control valves 233 through 237 respectively through individual hydraulic conduits 259, 260, 261, 262, and 263 respectively, as shown in FIG. 4.

Hydraulic conduit 264 operatively interconnects control valve 233 and the shaker motor 241. Hydraulic conduit 265 operably interconnects the shaker motor 241 and control valve 233. Hydraulic conduit 266 operatively interconnects control valve 234 and hydraulic cylinder 113. Hydraulic conduit 267 operatively interconnects hydraulic cylinder 113 and control valve 234. Hydraulic conduit 268 operably interconnects hydraulic conduit 266 and hydraulic cylinder 213. Hydraulic conduit 269 operably interconnects hydraulic cylinder 213 and hydraulic conduit 267.

Hydraulic conduit 280 interconnects control valve 235 and flow divider 240. Hydraulic conduit 281 operatively interconnects flow divider 240 and the hydraulic cylinder 127 on the right as viewed in FIG. 4. Hydraulic conduit 282 operatively interconnects the flow divider and the hydraulic cylinder 127 on the left as viewed in FIG. 4. Hydraulic conduit 282 is operatively connected to the hydraulic cylinder 127 on the right as viewed in FIG. 4. Hydraulic conduit 284 operatively interconnects the hydraulic cylinder 127 on the left as viewed in FIG. 4, is connected to hydraulic conduit 283 and is connected at its remote end to control valve 235. Hydraulic conduit 285 operatively interconnects hydraulic cylinder 187 and hydraulic conduit 283. Hydraulic conduit 286 operatively interconnects hydraulic cylinder 187 and hydraulic conduit 280.

Hydraulic conduit 287 operatively interconnects hydraulic conduit 284 and the first diverter 238. Hydraulic conduit 288 interconnects the first diverter 238 and hydraulic conduit 280.

Hydraulic conduit 289 operatively interconnects first diverter 238 and hydraulic cylinder 189 on the right as viewed in FIG. 4. Hydraulic conduit 290 operatively interconnects hydraulic conduit 289 and the hydraulic cylinder 189 on the left as viewed in FIG. 4. Hydraulic conduit 291 operatively interconnects first diverter 238 and the hydraulic cylinder 189 on the right as viewed in FIG. 4. Hydraulic conduit 292 operatively interconnects hydraulic conduit 291 and hydraulic cylinder 189 on the left as viewed in FIG. 4.

Hydraulic conduits 293 and 294 operatively interconnect first diverter 283 and second diverter 239. Hydraulic conduit 295 operatively interconnects second diverter 239 and hydraulic cylinder 165. Hydraulic conduit 296 operatively interconnects hydraulic cylinder 165 and second diverter 239.

Hydraulic conduit 310 operatively interconnects control valve 236 and hydraulic cylinder 62. Hydraulic conduit 311 operatively interconnects hydraulic cylinder 62 and control valve 236.

Hydraulic conduit 312 operatively interconnects control valve 237 and hydraulic cylinder 167. Hydraulic conduit 313 operatively interconnects hydraulic cylinder 163 and control valve 237.

OPERATION

The operation of the described embodiment of the subject invention is believed to be clearly apparent and is briefly summarized at this point. The shaking apparatus 10 is mounted on the vehicle 14 in the manner already described with the hitch 46 of the tongue member 43 mounted on the ball type trailer hitch 18 of the vehicle. Similarly, the linking arm 49 is mounted on and interconnects the pivotal connections 50 so as to link the carrier 30 and the rear portion 17 of the vehicle 14. Thus, the shaking apparatus 10 is mounted on the vehicle spaced laterally from the side portion 16 of the vehicle, as best shown in FIGS. 1, 2, 3, and 7. Consequently, the shaking arm 80 extends laterally from the vehicle 14 in substantially right angular relation to the normal direction of travel 19 of the vehicle. As can best be seen in FIG. 3, the wheels 40 and 42 of the apparatus are aligned along a path substantially parallel to the normal direction of travel 19 of the vehicle. However, as previously described, the rear wheel 42 is preferably of the swivel type or, more specifically, the rear wheel mount 41 is of the swivel type so as to facilitate maneuvering.

With the shaking apparatus 10 so oriented relative to the vehicle 14, the vehicle is driven to a position spaced laterally of a work zone 12, in this case a row of trees from which crops such as, for example, nuts are to be harvested. The vehicle is positioned so that the shaking head 100 of the shaking apparatus is spaced from the row of trees a distance substantially as shown in FIG. 3.

It will be understood that the shaking apparatus 10 can be used in combination with any suitable mechanism or vehicle for collecting the crops which are harvested. It is known, for example, to use another vehicle on the opposite side of the row having a catching frame deployed to collect the crops shaking from the opposite side of the tree. In this case, both catching frames would feed the crops gravitationally into conveyor systems for delivery to collection points. Both vehicles would thus operate together in harvesting the crops from each tree in succession. However, the shaking apparatus 10 can be operated for collection of the harvested crops in any manner desired and the invention hereof is not limited to any one arrangement in this regard.

The jaws 108 and 109 of the shaking head 100 are moved to the opened attitudes shown in FIGS. 3 and 15. This is achieved by operation of the third control valve 235 to cause the hydraulic cylinders 127 to contract and by operation of the second control valve 234 to permit the hydraulic cylinder 113 to expand. The pivot assemblies 120 thus move the jaws 108 and 109 to the opened positions shown in FIG. 15. Operation of the second control valve 234 in the manner described also causes the hydraulic cylinder 213 to expand so as to move the first and second closures 202 and 203 borne by the catching frame assembly 140 to the opened positions shown in FIGS. 11 and 14.

The hydraulic cylinder 165 is next adjusted to position the catching frame assembly 140 in the precise attitude desired. This is accomplished by operation of the control valve 235 and the first and second diverters 238 and 239 to adjust the expansion of the hydraulic cylinder 165 so as to pivot the subframe 144 to the attitude desired. Similarly, the hydraulic cylinder 163 is preferably contracted so as to raise the cam rollers 160 and thereby raise the lateral edge of the catching frame on the right as viewed in FIG. 2 to the position shown. Such operation of the hydraulic cylinder 163 is accomplished by appropriate operation of the control valve 237 to cause contraction of the hydraulic cylinder 163.

Still further, the hydraulic cylinder 62 is expanded or contracted as desired using control valve 236 to adjust the elevation of the shaking arm 80 using the arm suspension system 60. if the size of the tree requires, the shaking arm can be elevated, using the arm suspension system, until it is fully received in the recess 158 of the shaft 156.

Once such adjustments have been accomplished, the operator drives the vehicle 14 along the row of trees 12 to the first tree in the row to be harvested. A spacing of the shaking head 100 in relation to the tree trunk 13 is maintained as can best be visualized in FIGS. 3, 15, 16, and 17. When general alignment of the shaking head with the tree trunk 13 has been achieved, the operator operates control valve 235 to cause the hydraulic cylinders 127 to be expanded. This causes the pivot assemblies 120 through the links 124 and 126 thereof to pivot the jaws 108 and 109 about their respective first and second pivotal connections 104 and 107 respectively ninety degrees (90°) from the positions shown in FIG. 15 to the intermediate positions shown in FIG. 16. Because the pivot assemblies 120 are of the over-center type, as can be visualized in FIG. 16, the jaws 108 and 109 are locked in the positions relative to their respective first and sound pivotal connections 104 and 107 and thus are rigid relative to the fixed arm 102 and pivot arm 106 respectively.

When the operator operates control valve 235, the hydraulic cylinder assembly 186 is also operated through the first diverter 238. The first diverter 238 can be set in a position so that only hydraulic cylinder 187 is expanded or can be set in a position in which hydraulic cylinder 187 and hydraulic cylinders 189 are expanded. In any case, based upon the selection desired, the catching frame 170 is moved along the tracks 152 from the position shown in FIG. 2 to an extended position about the trunk of the tree so that the trunk extends through the opening 182 in the catching frame and between the closures 202 and 203, as best shown in FIG. 11.

The operator then operates control valve 234 to cause hydraulic cyinder 113 to contract so as to draw the cushions 111 of the jaws 108 and 109 into gripping engagement with the tree trunk 13, as shown in FIG. 17. Such movement is achieved by movement of the pivot arm 106 about the arm pivotal connection 105. Thus, the jaws automatically adjust to the diameter of the tree trunk 13 as controlled by the operator through the use of the control valve 234. As can best be visualized in FIG. 17, since movement of the jaws from the intermediate positions shown in FIG. 16 to the closed positions shown in FIG. 17 is achieved by pivotal movement of the pivot arm 106 about pivotal connection 105 which is spaced a substantial distance from the trunk, the trunk is captured substantially directly between the jaws regardless of the trunk's diameter.

Operation of the control valve 234 similarly causes the hydraulic cylinder 213 to contract to move the first and second closures 202 and 203 respectively from the opened positions shown in FIG. 11 to the closed positions shown in FIGS. 12 and 13. Such contraction of the hydraulic cylinder 213 causes the overlapping edges 214 of the closures to overlap a distance preferably of about five inches. The coil springs 211 and resilient panels 212 are thus drawn into and conformed to the diameter of the tree trunk 13 so as to form a positive seal therewith. There is virtually no gap in the engagement of the panels with the trunk.

Subsequently, the operator operates control valve 233 to initiate operation of the shaker motor 241. This operates the shaking mechanism within the housing 101 to impart a shaking motion to the trunk 13 of the tree as a result of the trunk being gripped between the jaws 108 and 109. The shaking operation is continued so long as the operator desires and until substantially all of the crops have been dislodged from the tree. The crops fall from the tree onto the catching frame 170 and roll gravitationally down the catching frame for receipt below and by any suitable mechanism, not shown, provided for the purpose as previously discussed. Those crops falling onto the closures 202 and 203 or onto the shroud 215 fall gravitationally therefrom onto the catching frame and subsequently down the catching frame for collection therebelow.

When this operation has been completed, the operator operates control valve 234 to expand hydraulic cylinder 113 and hydraulic cylinder 213. This causes the shaking head to be adjusted to the intermediate position shown in FIG. 16 and the first and second closures 202 and 203 to be moved to the opened position shown in FIG. 11. The operator then operates control valve 235 to contract hydraulic cylinders 127 so as to pivot the jaws 202 and 203 to the opened positions shown in FIG. 15. Such movement of control valve 235 also operates to cause the hydraulic cylinder assembly 186 to move the catching frame 170 again to the retracted position shown in FIG. 2. The operator then drives the vehicle along the row of trees 12 to the next successive tree in the row for repetition of the operation heretofore described for harvesting of the crops from that tree.

It will thus be seen that the shaking apparatus 10 can be employed to harvest crops from trees without having to maneuver the vehicle or the shaking head toward and from the tree. In other words, the vehicle need only be moved along a path substantially parallel to the row as long as the spacing therefrom is maintained substantially that shown in FIG. 3.

As heretofore described, the shaking arm 80 is suspended from the carrier 30 by the arm suspension system 60 and by the suspension assembly 84. These permit the arm to adjust laterally in either direction in the plane of suspension and to twist or pivot about its longitudinal axis. Thus, when the jaws 202 and 203 are moved into the closed positions in gripping relation to a tree trunk, if the tree trunk is not perfectly vertical or is in some way distorted, such engagement of the jaws with the trunk causes the shaking arm to tend to twist about its longitudinal axis thereby exerting downward force on one of the cables 70. Such force is accommodated by the arm suspension system 60 in that the end of the angle iron member 68 nearest the cable is pulled forwardly on the wear plates 59. Thus the frame 65 thereof pivots relative to the hydraulic cylinder about the vertical axis 67 thereby permitting such twisting of the shaking arm and automatically adjusting the jaws to the specific configuration of the tree trunk being gripped. Similarly, where the jaws are not precisely aligned with the tree trunk, the jaws in moviing to the closed positions cause the shaking arm to be moved laterally in either direction to achieve precise alignment automatically without repositioning of the vehicle 14. Such automatic adjustment is achieved by pendant suspension of the shaking arm on the carrier and by the operation of the arm suspension system 60 as described.

Adjustment of the subframe 144 to the precise angle and position desired is facilitated by the interoperation of the cam rollers 160 and the arcuate portions 154 of the cam tracks 153. As the hydraulic cylinder 165 is expanded, the subframe is elevated on the lever arms 143 and moved generally to the right as viewed in FIG. 2. Once movement of the catching frame assembly has progressed beyond the position shown in FIG. 2 and with the cam rollers 160 in the elevated positions shown in FIG. 2, the arcuate portions of the cam tracks move over the rollers and tend to raise the portion of the subframe thereabove. However, the operative effect in continued movement of the lever arms 143 is to cause the subframe and thus the catching frame 170 to move through positions of parallelism to that shown in FIG. 2 from that shown in FIG. 2 to positions further to the right as viewed therein. This operates to maintain substantially the same angle while moving the catching frame to the right. If the portion of the subframe above the rollers 160 is too high for the particular tree being harvested, the hydraulic cylinder 163 can be expanded to cause rollers to move into the positions shown in FIG. 9 thereby lowering that portion of the subframe and the catching frame 170 borne thereby. However, in most instances once the appropriate angle for the subframe 144 has been selected by the operator for the trees to be harvested, the only operation that needs to be performed for harvesting of the trees is extension and retraction of the catching frame 170 on the tracks 152 using the hydraulic cylinder assembly 186.

As can be visualized in FIGS. 12 and 13, the closures 202 and 203 of the tree sealing assembly 200 overlap each other approximately five inches to form a positive seal with the tree trunk 13 of the tree being harvested. As shaking motion is imparted to the tree trunk below by the shaking head 100, the tree trunk may move in virtually any direction throughout a range of three hundred sixty degrees (360°). Motion of the tree trunk along an axis substantially parallel to the closures is accommodated by the coil springs 211 and resilient panels 212. More specifically, the tree trunk moves between the springs and panels toward or from the longitudinal beam 174 and the coil springs and resilient panels accommodate such motion by being forced apart at the point of conact with the trunk in the direction of movement and by closing in behind the trunk on the opposite side thereof. This maintains a seal with the tree trunk during such motion. Motion of the tree trunk 13 along an axis generally from side to side as viewed in FIG. 12 is accommodated by the tree sealing assembly simply pivoting on the pair of bearings 201 from side to side. Of course, there is some accommodation by the coil springs and panels themselves as well. Thus, it will be seen that the two operations, when taken together, cooperate to maintain a positive seal with the tree trunk so as virtually to preclude a loss of crops therethrough while in no way interfering with operation of the shaking head 100 therebelow.

Therefore, the shaking apparatus 10 of the present invention reduces to an absolute minimum the time required for maneuvering and positioning of the shaking head, insures alignment and adjustment to the individual characteristics of each tree which is to be harvested on a substantially automatic basis, and affords a seal about the tree during harvesting capable preventing any crop loss therethrough and without in any way interfering with the harvesting operation.

Although the invention has been herein shown and described in what is conceived to be the most practical and preferred embodiment, it is recognized that departures may be made therefrom within the scope of the invention, which is not to be limited to the illustrative details disclosed.

Having described our invention, what we claim as new and desire to secure by Letters Patent is:

1. A shaking apparatus comprising an arm oriented substantially along a longitudinal axis and adapted to be mounted on a vehicle for earth traversing movement therewith; means for mounting said arm on the vehicle including a pair of linear members secured on the arm on opposite sides of said longitudinal axis of the arm and connected to a means of support operable to permit said linear members independently to adjust to limited movement of the arm substantially about said longitudinal axis while supporting said arm; a pair of jaws mounted on the arm and movable relative to each other between an opened attitude in which said jaws are separated from each other and a closed attitude in which said jaws are juxtaposed relative to each other; means borne by the arm for moving the jaws between said opened and closed attitudes whereby the jaws in being moved to the closed attitude are operable to capture an object therebetween and automatically to adjust to the angle of the object by contact of the jaws therewith to cause said limited movement about said longitudinal axis as permitted by said linar members; and means mounted on the apparatus for shaking the jaws to impart a shaking motion to an object captured between the jaws in the closed attitude.

2. A shaking apparatus comprising a carrier adapted to be mounted on a vehicle for earth traversing movement in a predetermined direction of travel substantially parallel and in spaced relation to a work zone and having a wheel mounted on the carrier supporting said carrier for earth traversing movement, said carrier adapted to be mounted on said vehicle extending laterally therefrom with respect to said direction of travel; an arm extending laterally from the vehicle with respect to the direction of travel to a position in spaced relation to the work zone, said arm being pendantly supported on the carrier between the opposite ends of the arm by a pair of cables connected to the arm at spaced points of connection aligned along a path substantially parallel to said direction of travel and the cables individually entrained over a pair of pulleys and connected at their distal ends to a slide member mounted on the carrier for substantially pivotal movement about a substantially vertical axis; a pair of jaws mounted on the arm and movable relative to each other between an opened attitude in which said jaws are separated from each other and spaced from said zone and a closed attitude in which said jaws are juxtaposed relative to each other and extend into said zone; means borne by the arm for moving the jaws between said opened and closed attitudes whereby the jaws self align with an object in moving to said closed attitude by shifting in contact with the object as permitted by substantially pivotal movement of the slide member relative to said vertical axis; and means mounted on the apparatus for shaking the jaws to impart a shaking motion to an object captured between the jaws in the closed attitude.

3. The apparatus of claim 2 including means interconnecting the carrier and the slide member for raising and lowering the arm relative to the carrier.

4. A shaking apparatus for mounting on a vehicle adapted for movement in a predetermined direction of travel substantially parallel to a row of trees for harvesting the crops therefrom, the apparatus comprising:
  A. a carrier having a vehicle mount adapted to be secured on the vehicle with the carrier laterally disposed from the vehicle with respect to said direction of travel and having a ground engaging wheel aligned with the direction of travel in spaced relation to the vehicle mount;
  B. an arm suspended on a cable beneath the carrier in substantially right angular relation to the direction of travel and extending to a work portion remote from the vehicle mount;
  C. means borne by the carrier for raising and lowering said cable selectively to position the arm relative to the carrier;
  D. a grasping assembly mounted on the work portion of the arm including a pair of jaws mounted for pivotal movement about a pair of substantially vertical axes a first of which is fixed relative to the arm and a second of which is movable toward and from the first axis, hydraulic cylinder assemblies individually connected to the jaws and operable to move the jaws about their respective axes from opened positions wherein the jaws are substantially aligned with each other substantially parallel to the direction of travel and intermediate positions rotated about their respective axes approximately ninety degrees (90°) from their respective opened positions and an hydraulic cylinder interconnecting the jaws operable to move the jaws to and from closed positions, in which the jaws are substantially parallel to each other for grasping a tree trunk therebetween, from said intermediate positions;
  E. means borne by the apparatus for shaking the grasping assembly to impart crop dislodging motion to a tree trunk captured between the jaws in the closed positions;
  F. a crop catching frame mounted on the carrier for movement from a retracted position in which a lower lateral edge thereof is adjacent to the jaws in the opened positions and an extended position in which the lower lateral edge is above the jaws in the closed positions, said catching frame having an opening therein extending inwardly from the lower lateral edge in alignment with the jaws for extending about a tree trunk captured between the jaws; and
  G. a trunk engaging assembly mounted on the catching frame having a pair of closures movable from retracted positions on opposite sides of the opening of the catching frame to extended positions covering said opening, each of said closures having a mouth across which is extended a resilient member with flexible sheet material extending from said resilient member over the closure, and means for moving the closures to and from the extended positions with a tree trunk graspd in the grasping assembly extending through the opening of the catching frame with the closures conforming to the periphery of the trunk so as to prevent crops from falling through said opening in the catching frame.

5. The apparatus of claim 4 wherein said closures are overlapped in the extended positions and are mounted for free-swinging movement as a unit with said tree trunk extending therethrough whereby movement of the trunk substantially parallel to the resilient members is accommodated by said resilient members while substantially conforming to the tree trunk and wherein movement of the tree trunk substantially normal to the resilient members is accommodated by said free-swinging movement of the closures.

6. A shaking apparatus comprising a vehicle; an arm assembly having a longitudinal axis; an arm suspension assembly mounted on the vehicle, the arm suspension assembly including a pair of bearing members mounted on the vehicle in spaced relation to each other and substantially horizontally aligned, a pair of cables individually extending over the bearing members and secured in supporting relation to the arm assembly on opposite sides of said longitudinal axis thereof and a cable mounting assembly secured on the cables on the opposite side of the bearing members from the arm assembly and secured on the vehicle in supporting relation to said arm assembly for substantially pivotal movement of said cable mounting assembly about a substantially vertical axis; a pair of jaws mounted on the arm assembly and movable relative to each other between opened and closed attitudes; means for moving the jaws toward the closed attitude and substantially into grasping relation to a work object and by engagement of the jaws with the work object to adjust to the attitude of said work object by limited pivotal movement of the arm assembly about the longitudinal axis thereof as accommodated by the arm suspension assembly; and means for shaking the jaws to impart a shaking motion to the work object captured between the jaws.

7. The shaking apparatus of claim 6 in which the cable mounting assembly is rested on a supporting surface for movement toward and from the bearing members and the arm suspension assembly includes an hydraulic cylinder operable to move the cable mounting assembly toward and from the bearing members selectively elevationally to position the arm assembly.

8. A grasping assembly for a shaking apparatus comprising a frame adapted to be mounted on a shaking apparatus; a first jaw borne by the frame for substantially pivotal movement substantially only about a first axis; an arm mounted on the frame for substantially pivotal movement about an arm axis remote from and substantially parallel to said first axis; a second jaw mounted on the arm for substantially pivotal movement substantially only about a second axis spaced from and substantially parallel to the arm axis; and means for moving said first and second jaws about their respective first and second axis and the arm about said arm axis between opened positions; in which the arm is disposed in an attitude in which said first and second axes are spaced a relatively great distance from each other and the first and second jaws are disposed to extend from each other in substantial opposite directions, and closed positions, in which the first and second axes are relatively nearer each other and the first and second jaws are disposed in juxtaposition.

9. The grasping assembly of claim 8 wherein said moving means includes a pivot assembly individual to each jaw, each pivot assembly having a linkage pivotally connected to its respective jaw at a position eccentric to its respective first or second axis and pivotally connected to the grasping assembly at a point spaced from said first or second axis and an hydraulic cylinder connected to the linkage and operable to contract the pivot assembly to move the jaws to said opened positions and to extend the pivot assembly to move the jaws to said closed positions in which the linkage of each jaw contacts the grasping assembly thereby releasably locking the jaws in said closed positions.

10. A work object engaging assembly for the catching frame of a shaking apparatus comprising a pair of closures individually having rigid frames bounding recesses which extend inwardly thereof from corresponding mouths, resilient members borne by the frames extending under tension in obstructing relation to said mouths of the recesses and flexible sheet material mounted on the frames in covering relation to the recesses and extending over the resilient members; and means for mounting the closures on a shaking apparatus above the catching frame thereof for movement between opened positions spaced from each other for the ingress and egress of a work object therebetween and closed positions in which said resilient members retain the flexible sheet material of the closures resiliently in substantially conforming relation to the work object extended therebetween as the work object is moved during shaking.

11. The work object engaging assembly of claim 10 wherein said mounting means mounts the closures for substantially free swinging movement, when the closures are in said closed positions, in response to motion of the work object during shaking.

12. The work object engaging assembly of claim 10 wherein said closures overlap each other in the closed positions and are inclined in the direction of the resilient members so that objects falling on the sheet material are gravitationally urged from the closures in directions extending away from the resilient members.

13. The work object engaging assembly of claim 10 wherein said resilient members are coil springs extending under tension across their respective mouths of the frames and said closures are sufficiently overlapped in the closed positions so that said springs retain the flexible sheet material in substantially fitted engagement with the work object extended therebetween during motion of the work object in substantially any laterial direction.

* * * * *

UNITED STATES PATENT AND TRADEMARK OFFICE
CERTIFICATE OF CORRECTION

PATENT NO. : 4,414,795

DATED : November 15, 1983

INVENTOR(S) : Theodore R. Johnstone and James P. Kaatz

It is certified that error appears in the above-identified patent and that said Letters Patent is hereby corrected as shown below:

Column 1, line 28, delete "effects" and substitute ---efforts---.

Column 2, line 18, after "vehicle" delete "of" and substitute ---or---.

Column 3, line 44, delete "operation" and substitute ---opened---.

Column 4, line 9, delete "attained" and substitute ---attached---.

Column 4, line 10, delete "shrinking" and substitute ---shaking---.

Column 4, line 39, delete "provide" and substitute ---pivot---.

Column 4, line 49, delete "nitch" and substitute ---hitch---.

Column 5, line 20, delete "linear members or".

Column 5, line 22, between "of" and "cables" insert ---linear members or---.

Column 6, line 3, after "side" (second instance) delete "of" and substitute ---on---.

Column 6, line 18, delete "not" and substitute ---no---.

Column 7, line 51, delete "shanking" and substitute ---shaking---.

Column 10, line 3, delete "is" and substitute ---in---.

Column 10, line 6, before "members" insert ---side---.

Column 11, line 34, delete "282" and substitute ---283---.

Column 12, line 2, delete "167" and substitute ---163---.

Column 13, line 10, delete "if" and substitute ---If---.

Column 14, line 65, delete "moviing" and substitute ---moving---.

Column 15, line 48, delete "conact" and substitute ---contact---.

Column 16, line 33, delete "linar" and substitute ---linear---.

UNITED STATES PATENT AND TRADEMARK OFFICE
CERTIFICATE OF CORRECTION

PATENT NO. : 4,414,795

DATED : November 15, 1983

INVENTOR(S) : Theodore R. Johnstone and James P. Kaatz

It is certified that error appears in the above-identified patent and that said Letters Patent is hereby corrected as shown below:

Column 17, line 63, delete "graspd" and substitute ---grasped---.

Column 20, line 21, delete "lateral" and substitute ---lateral---.

Signed and Sealed this

Thirty-first Day of January 1984

[SEAL]

Attest:

GERALD J. MOSSINGHOFF

Attesting Officer

Commissioner of Patents and Trademarks